Dec. 7, 1943.  M. E. HANSON  2,336,242
AIR CONDITIONING CONTROL
Filed Feb. 14, 1941
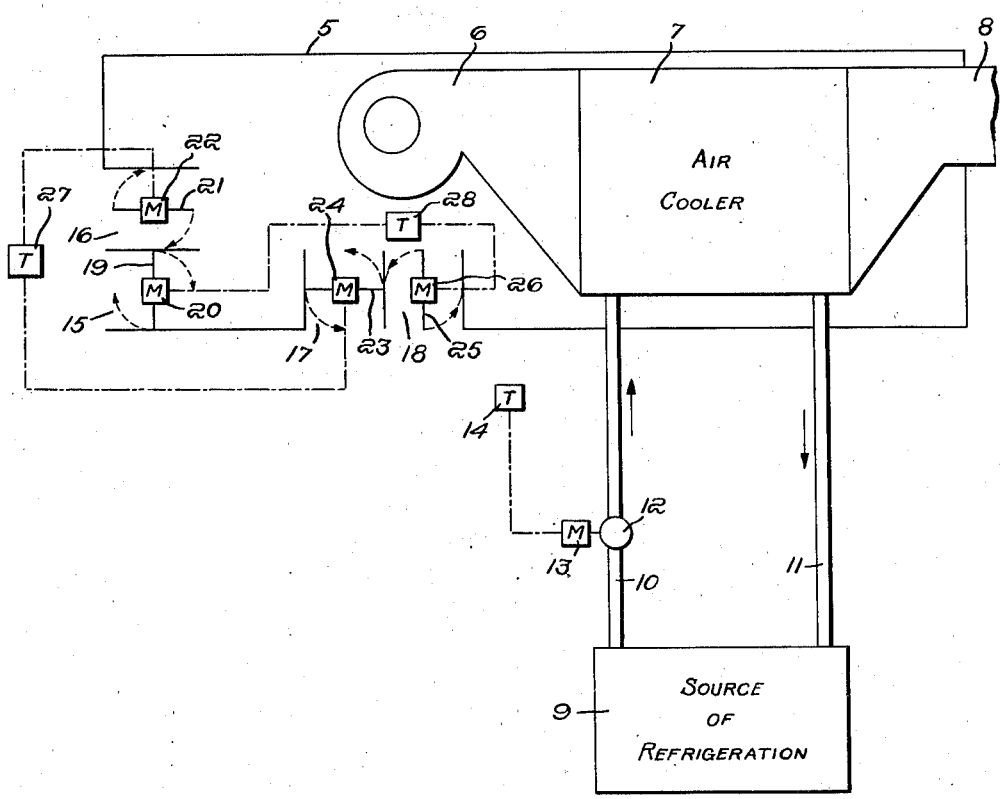
Inventor:
Milton E. Hanson,
by Robert T. Palmer
Attorney Patented Dec. 7, 1943

2,336,242

UNITED STATES PATENT OFFICE 2,336,242

AIR CONDITIONING CONTROL

Milton E. Hanson, Haddonfield, N. J., assignor to B. F. Sturtevant Company, Boston, Mass.

Application February 14, 1941, Serial No. 378,928

6 Claims. (Cl. 236—44)

This invention relates to the conditioning of air and relates more particularly to the conditioning of air for passenger vehicles such as railway passenger cars.

It is desirable in railway passenger car conditioning systems to cool in summer, 100% outdoor air at all times except when the load on the refrigeration apparatus is too great to justify the advantages of using all outdoor air. By using all outdoor air whenever feasible, the odors resulting from recirculation of air are avoided and the air is purer due to the absence of harmful germs which are often found in recirculated air. When however the wet bulb temperature of the outdoor air is relatively high, the expense of cooling all outdoor air by refrigeration becomes excessive.

In prior systems such as the one disclosed in the Anderson Patent No. 2,157,685, 100% outdoor air is used only when the wet bulb temperature of the outdoor air is low enough for evaporative cooling to be effective, refrigeration being omitted during the evaporative cooling periods.

This invention utilizes 100% outdoor air during periods when the wet bulb temperature of the outdoor air is too high for evaporative cooling to be effective, refrigeration being required of course during such periods. It also provides however for utilizing partial recirculation when the wet bulb temperature of the outdoor air is so high that the cost of cooling all outdoor air is so great that the advantages of using all outdoor air are outweighed, and when the wet bulb temperature in the passenger area is too high as a result of the use of 100% outdoor air.

A wet bulb thermostat in the outdoor air stream opens its associated outdoor air dampers and closes its associated recirculated air dampers when the outdoor wet bulb is not too high. A second wet bulb thermostat in the recirculated air stream responds to the condition of the air after cooling and after circulation through the passenger area, and if the wet bulb temperature of the recirculated air is not too high, it opens its associated outdoor air dampers and moves its associated recirculated air dampers towards closed position. The system thus at this time handles substantially 100% outdoor air. If the wet bulb temperature of the recirculated air rises above the critical temperature, the recirculated air dampers controlled by the wet bulb thermostat in the recirculated air stream are opened and the associated outdoor dampers are closed. Thus the wet bulb thermostat in the recirculated air stream prevents the use of 100% outdoor air when the wet bulb temperature in the passenger space is too high.

The wet bulb thermostat in the outdoor air stream does not permit the use of 100% outdoor air except when its wet bulb temperature is low enough to justify its use.

Thus the use of the two thermostats permits the use of 100% outdoor air except when its use would result in too great a refrigeration cost and when the wet bulb temperature in the passenger space is too high.

The object of this invention is to condition 100% outdoor air when the outdoor wet bulb temperature does not exceed what may be termed an economic level and when the wet bulb temperature in the passenger space is not too high, and to condition mixed outdoor air and recirculated air when the wet bulb temperature of the outdoor air exceeds the economic level and when the wet bulb temperature in the passenger space is too high.

The invention will now be described with reference to the drawing which illustrates diagrammatically one embodiment of the invention.

The overhead conditioning unit 5 contains the centrifugal fan 6 and the air cooler 7. The usual distributing duct 8 connects with the output side of the cooler 7.

The refrigeration source 9 is connected by the supply pipe 10 and the return pipe 11, with the air cooler 7. The valve 12 in the supply pipe 10 controls the degree of refrigeration supplied by the source 9 to the cooler 7 and is adapted to be adjusted by the motor 13 under the control of the dry bulb thermostat 14 which responds to temperature variations in the space served by the equipment with conditioned air.

The source 9 of refrigeration may be an ice water supply or a source of mechanical refrigeration. The valve 12 may be a modulating valve or an on-off valve. Equivalent forms of controls are those for unloading cylinders of a multi-cylinder refrigerant compressor or for varying the surface of a variable surface air cooling evaporator.

The unit 5 has the two outdoor air inlets 15 and 16, and the two recirculated air inlets 17 and 18 connecting with the inlet of the fan 6. The outdoor air inlet 15 contains the damper 19 shown in closed position but adapted to be rotated by the motor 20 to open position. The outdoor air inlet 16 contains the damper 21 shown in open position but adapted to be rotated by the motor 22 to closed position. The recirculated air inlet 17 contains the damper 23 shown in closed position but adapted to be rotated by the motor 24 to open position. The recirculated air inlet 18 contains the damper 25 shown in open position but adapted to be rotated by the motor 26 to closed position.

The outdoor, wet bulb thermostat 27 controls the positions of the outdoor air damper 21 and of the recirculated air damper 23 and when the wet bulb temperature of the outdoor air is below say for example, 70° F., the thermostat 27 would control the motors 22 and 24 to adjust the dampers 21 and 23 respectively to the position shown. The fan 6 would then draw in outdoor air through the inlet 16 but the recirculated air inlet 17 would be closed. Then when the outdoor wet bulb temperature rises above 70° F., the thermostat 27 would actuate the motor 22 to rotate the damper 21 to close the outdoor air inlet 16 and would actuate the motor 24 to rotate the damper 23 to open the recirculated air inlet 17.

The wet bulb thermostat 28 is in the path of the recirculated air entering the fan 6 and controls the position of the dampers 19 and 25 in the outdoor air inlet 15 and the recirculated air inlet 18 respectively. When the wet bulb temperature of the recirculated air is above say for example, 65° F., the thermostat will control the motors 20 and 26 to adjust the dampers 19 and 25 to the position illustrated, the outdoor air inlet 15 being closed and the recirculated air inlet 18 being open. Then when the wet bulb temperature of the recirculated air is below 65° F., the thermostat 28 causes the motor 20 to rotate the damper 19 to open position and causes the motor 26 to rotate the damper 25 to closed position.

It will be observed that when the outdoor air wet bulb temperature is below 70° F., and the wet bulb temperature of the recirculated air is below 65° F., the recirculated air inlets are closed and the outdoor air inlets are open so that the fan 6 draws in 100% outdoor air, the preferred operating condition.

When the outdoor wet bulb temperature is above 70° F., and the wet bulb temperature of the recirculated air is below 65° F., the fan will draw in 50% outdoor air and 50% recirculated air.

When the outdoor wet bulb temperature is below 70° F., and the wet bulb temperature of the recirculated air is above 65° F., the fan will draw in 50% outdoor air and 50% recirculated air.

When the outdoor wet bulb temperature is above 70° F. and the wet bulb temperature of the recirculated air is above 65° F., the fan would draw in 100% recirculated air. This would be an unusual condition which would seldom occur for increases in the wet bulb temperature of the recirculated air in railway passenger cars are usually caused by increases in the wet bulb temperature of the outdoor air entering the car during off cycles of the refrigerant compressor, so that the thermostat 27 would anticipate this happening and act at such times to decrease the volume of outdoor air entering the system. The indoor dry bulb thermostat would also act to prevent this condition happening and to shorten its period if it did happen, by calling for more refrigerating and dehumidifying action. If it were desired to ensure a supply of outdoor air at all times for ventilation then of course the outdoor air dampers could be blocked so that they could not completely close.

The controls described are thus seen to provide 100% outdoor air at all times when the refrigeration load is not excessive as a result of high outdoor wet bulb temperatures and to accomplish this without excessive cycling of the refrigeration apparatus.

While one embodiment of the invention has been described for the purpose of illustration, it should be understood that the invention is not limited to the exact apparatus and arrangement of apparatus illustrated, as modifications thereof may be suggested by those skilled in the art without departure from the essence of the invention.

What is claimed is:

1. An air conditioning system comprising an air cooler having two outdoor air inlets and two recirculated air inlets, dampers in said inlets, means including an outdoor air thermostat for adjusting said dampers in one of said outdoor air and in one of said recirculated air inlets, and means including an indoor thermostat for adjusting said dampers in the other of said outdoor air and in the other of said recirculated air inlets.

2. An air conditioning system comprising an air cooler having two outdoor air inlets and two recirculated air inlets, dampers in said inlets, means including an outdoor air wet bulb thermostat for adjusting said dampers in one of said outdoor air and in one of said recirculated air inlets, and means including an indoor wet bulb thermostat for adjusting said dampers in the other of said outdoor air and in the other of said recirculated air inlets.

3. An air conditioning system comprising an air cooler having two outdoor air inlets and two recirculated air inlets, dampers in said inlets, means including an outdoor air thermostat for adjusting said dampers in one of said outdoor air and in one of said recirculated air inlets for increasing the volume of outdoor air and decreasing the volume of recirculated air upon a decrease in the outdoor air temperature below a predetermined point, and means including an indoor thermostat for adjusting said dampers in the other of said outdoor air and in the other of said recirculated air inlets for increasing the volume of outdoor air and for decreasing the volume of recirculated air upon a decrease in the indoor air temperature below a predetermined point.

4. An air conditioning system comprising an air cooler having two outdoor air inlets and two recirculated air inlets, dampers in said inlets, means including an outdoor air thermostat for adjusting said dampers in one of said outdoor air and in one of said recirculated air inlets for increasing the volume of outdoor air and decreasing the volume of recirculated air upon a decrease in the outdoor air temperature below a predetermined point and for decreasing the volume of outdoor air upon an increase in the outdoor air temperature above said point, and means including an indoor thermostat for adjusting said dampers in the other of said outdoor air and in the other of said recirculated air inlets for increasing the volume of outdoor air and for decreasing the volume of recirculated air upon a decrease in the indoor air temperature below a predetermined point and for decreasing the volume of outdoor air and for increasing the volume of recirculated air upon an increase in the indoor air temperature above said last mentioned point.

5. An air conditioning system comprising an air cooler having two outdoor air inlets and two recirculated air inlets, dampers in said inlets, means including an outdoor air wet bulb thermostat for adjusting said dampers in one of said outdoor air and in one of said recirculated air inlets for increasing the volume of outdoor air and decreasing the volume of recirculated air upon a decrease in the outdoor air temperature below a predetermined point, and means including an indoor wet bulb thermostat for adjusting said dampers in the other of said outdoor air and in the other of said recirculated air inlets for increasing the volume of outdoor air and for decreasing the volume of recirculated air upon a decrease in the indoor air temperature below a predetermined point.

6. An air conditioning system comprising an air cooler having two outdoor air inlets and two recirculated air inlets, dampers in said inlets, means including an outdoor air wet bulb thermostat for adjusting said dampers in one of said outdoor air and in one of said recirculated air inlets for increasing the volume of outdoor air and decreasing the volume of recirculated air upon a decrease in the outdoor air temperature below a predetermined point and for decreasing the volume of outdoor air upon an increase in the outdoor air temperature above said point, and means including an indoor wet bulb thermostat for adjusting said dampers in the other of said outdoor air and in the other of said recirculated air inlets for increasing the volume of outdoor air and for decreasing the volume of recirculated air upon a decrease in the indoor air temperature below a predetermined point and for decreasing the volume of outdoor air and for increasing the volume of recirculated air upon an increase in the indoor air temperature above said last mentioned point.

MILTON E. HANSON.